United States Patent
Sha et al.

(10) Patent No.: US 11,792,876 B2
(45) Date of Patent: Oct. 17, 2023

(54) PRE-CONFIGURED DEDICATED RESOURCE FOR IDLE MODE TRANSMISSIONS

(71) Applicant: ZTE Corporation, Guangdong (CN)

(72) Inventors: Xiubin Sha, Guangdong (CN); Bo Dai, Guangdong (CN); Ting Lu, Guangdong (CN); Kun Liu, Guangdong (CN); Xu Liu, Guangdong (CN)

(73) Assignee: ZTE Corporation, Guangdong (CN)

( * ) Notice: Subject to any disclaimer, the term of this patent is extended or adjusted under 35 U.S.C. 154(b) by 203 days.

(21) Appl. No.: 17/170,112

(22) Filed: Feb. 8, 2021

(65) Prior Publication Data

US 2021/0168895 A1    Jun. 3, 2021

Related U.S. Application Data

(63) Continuation of application No. PCT/CN2018/099627, filed on Aug. 9, 2018.

(51) Int. Cl.
*H04W 76/27*    (2018.01)
*H04W 52/02*    (2009.01)
*H04W 72/23*    (2023.01)

(52) U.S. Cl.
CPC ....... *H04W 76/27* (2018.02); *H04W 52/0235* (2013.01); *H04W 72/23* (2023.01)

(58) Field of Classification Search
None
See application file for complete search history.

(56) References Cited

U.S. PATENT DOCUMENTS 10,051,507 B2    8/2018  Hsu et al.
10,638,486 B2    4/2020  Luo et al.
(Continued)

FOREIGN PATENT DOCUMENTS

CN    105340355 A    2/2016
CN    105960023      9/2016
(Continued)

OTHER PUBLICATIONS

European Extended Search Report, EP Application No. 18929075.2, dated Oct. 29, 2021, 11 pages.
(Continued)

*Primary Examiner* — Clemence S Han
(74) *Attorney, Agent, or Firm* — Perkins Coie LLP

(57) ABSTRACT

Methods, systems, and devices for providing pre-configured dedicated resources for communications during the RRC (radio resource control) idle state, thereby enabling significant energy savings during the communication of small data packets, are described. One exemplary method for wireless communication includes transmitting a first message comprising an indication of pre-configured terminal-specific dedicated resources for a communication between the network device and a terminal, and receiving information from the terminal over the pre-configured terminal-specific dedicated resources, wherein the terminal is in an idle mode and is without an established RRC connection. Another exemplary method for wireless communication includes receiving a first message comprising an indication of pre-configured terminal-specific dedicated resources for a communication between a network device and the terminal, and transmitting, while in the idle mode and without an established RRC connection, information over the pre-configured terminal-specific dedicated resources.

14 Claims, 10 Drawing Sheets

(56) References Cited

U.S. PATENT DOCUMENTS

| | | | |
|---|---|---|---|
| 11,363,666 B2* | 6/2022 | Wang | H04L 1/0003 |
| 2015/0003355 A1 | 1/2015 | Dalsgaard et al. | |
| 2016/0150475 A1 | 5/2016 | Rune | |
| 2017/0118741 A1 | 4/2017 | Jung et al. | |
| 2018/0192354 A1 | 7/2018 | Yi et al. | |
| 2019/0342800 A1* | 11/2019 | Sirotkin | H04B 17/318 |
| 2020/0037345 A1* | 1/2020 | Ryoo | H04W 72/1268 |
| 2020/0053795 A1* | 2/2020 | Lin | H04W 72/20 |
| 2020/0187245 A1* | 6/2020 | Fujishiro | H04W 72/23 |
| 2020/0413454 A1* | 12/2020 | Ye | H04L 5/0007 |
| 2021/0120622 A1* | 4/2021 | Fujishiro | H04W 76/30 |
| 2021/0235265 A1* | 7/2021 | Stattin | H04W 76/18 |
| 2022/0256587 A1* | 8/2022 | Fujishiro | H04W 4/70 |

FOREIGN PATENT DOCUMENTS

| | | |
|---|---|---|
| CN | 106211332 A | 12/2016 |
| CN | 106233794 | 12/2016 |
| CN | 106233807 | 12/2016 |
| CN | 107431880 | 12/2017 |
| EP | 3799515 A1 | 3/2021 |
| WO | 2015/116732 A1 | 8/2015 |

OTHER PUBLICATIONS

Huawei, et al. "Early DL data transmission," 3GPP TSG-RAN WG2 Meeting #102 Busan, Korea, 21st May 25, 2018, R2-1807849 Resubmission of R2-1805081, 5 pages.

International Search Report and Written Opinion in International Application No. PCT/CN2018/099627, dated Apr. 30, 2019, 6 pages.

Chinese Office Action for Application No. 201880096469.6 dated Apr. 20, 2023, 10 pages with unofficial translation.

Qualcomm Incorporated "Email discussion report: [99#45][NB-IoT/MTC] Early data transmission" 3GPP TSG-RAN WG2 Meeting #99bis R2-1710888, Prague, Czechia, Oct. 9-13, 2017, 42 pages.

CIPO, Notice of Allowance for Canadian Application No. 3,109,174, dated May 4, 2023, 1 page.

* cited by examiner

PRE-CONFIGURED DEDICATED RESOURCE FOR IDLE MODE TRANSMISSIONS

CROSS-REFERENCE TO RELATED APPLICATIONS

This application is a continuation of International Patent Application No. PCT/CN2018/099627, filed on Aug. 9, 2018, the contents of which are incorporated herein by reference in their entirety.

TECHNICAL FIELD

This document is directed generally to wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques need to provide support for an increased number of users and devices, thereby requiring methods to conserve energy, especially during the constant communication of small data packets.

SUMMARY

This document relates to methods, systems, and devices for providing pre-configured dedicated resources for communications during the RRC (radio resource control) idle state, thereby enabling significant energy savings during the communication of small data packets.

In one exemplary aspect, a wireless communication method is disclosed. The method includes transmitting a first message comprising an indication of pre-configured terminal-specific dedicated resources for a communication between the network device and a terminal, and receiving information from the terminal over the terminal-specific pre-configured dedicated resources, wherein the terminal is in an idle mode and is without an established RRC connection.

In another exemplary aspect, a wireless communication method is disclosed. The method includes receiving a first message comprising an indication of pre-configured terminal-specific dedicated resources for a communication between a network device and the terminal, and transmitting, while in the idle mode and without an established RRC connection, information over the pre-configured terminal-specific dedicated resources.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

In M2M (Machine-to-Machine) communication systems, UE (user equipment) energy saving is crucial. The power consumption of the UE is mainly reflected in the establishment of the RRC connection process, and the data transmission, reception and channel monitoring in the RRC connection state. For (Narrowband) NB-IoT (Internet-of-Things) technology, which mainly carries small data transmission, the UE keeps the RRC connection state for a short time, so the UE power consumption is mainly consumed in the RRC connection establishment phase (e.g. in the PRACH (physical random access channel) process). With the introduction of EDT (Early Data Transmission), wherein small data packets can be transmitted in the PRACH process, UEs transmitting small data packets do not need to enter the RRC connection state. Thus, the power consumption of the UE transmitting small data is mainly consumed in the PRACH process.

The PRACH process in the RRC connection establishment process is generally based on contention-based PRACH resources, and the process is divided into four steps:

Step 1: Preamble (Msg1: UE to eNodeB)
Step 2: RAR (Random Access Channel Response) (Msg2: eNodeB to UE)
Step 3: 1st RRC Message (Msg3: UE to eNodeB)
Step 4: 2nd RRC Message (Msg4: eNodeB to UE)

The Msg3 carries the UE identifier, and the Msg4 completes the contention resolution based on the UE identifier (identifies the UE), and the PRACH process ends. In the non-EDT scheme, after the contention resolution is completed, the UE enters the RRC connection state and starts UE-Specific data transmission. For the EDT solution, Msg3 can carry uplink data, Msg4 can carry downlink data, and the data has been successfully sent to the destination once the contention resolution completes successfully, and the UE returns to the RRC idle state. It can be seen from this process that Msg1 and Msg2 are essential for both EDT and non-EDT solutions.

If the idle mode UE is pre-configured with dedicated resources, the data transmission and reception can be performed on the pre-configured dedicated resources, and the contention resolution (UE identification) can be completed based on the pre-configured resources in Msg2, thereby shortening the PRACH process and improving small data transmission efficiency. In some embodiments of the disclosed technology, and as described in the present document, the pre-configured dedicated resources are referred to as pre-configured UE-specific (or terminal-specific) dedicated resources (e.g., intended for a particular UE or terminal).

The dedicated resources of the UE in the idle mode can only be configured in the previous RRC connection state, and the pre-configured resource policies and service flows involved in different pre-configured resource types are different.

Embodiments of the disclosed technology provide a dedicated resource pre-configuration method for UE based on pre-configured resource-based data transmission in the RRC idle mode.

Figure 1:
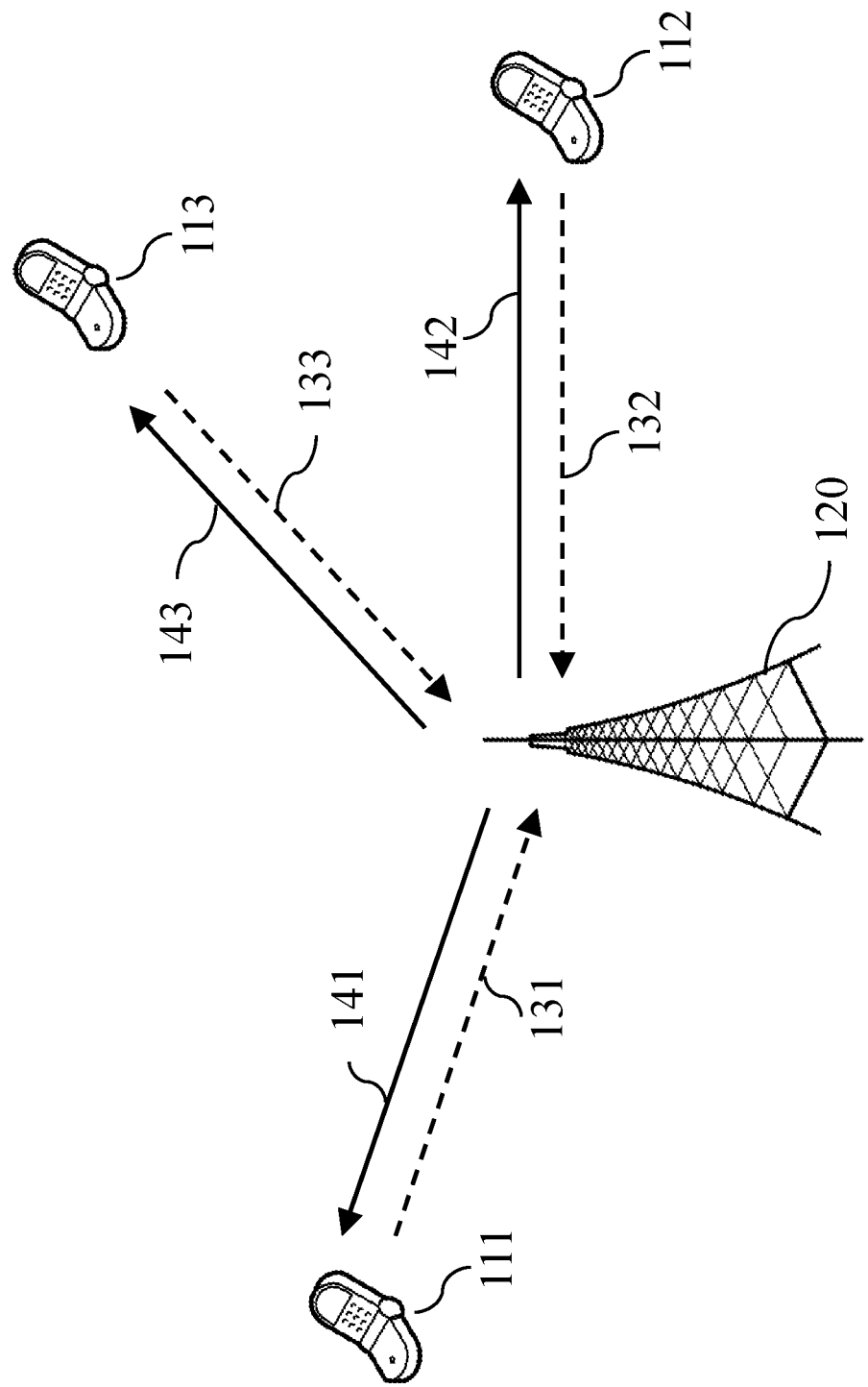
FIG. 1 shows an example of a base station (BS) and user equipment (UE) in wireless communication, in accordance with some embodiments of the presently disclosed technology.

FIG. 1 shows an example of a wireless communication system (e.g., an LTE, 5G or NR cellular network) that includes a BS 120 and one or more user equipment (UE) 111, 112 and 113. In some embodiments, the BS transmits an indication of the pre-configured dedicated resources (141, 142, 143) to the UEs. Subsequently, the UEs can use those UE-specific dedicated resources for communication (131, 132, 133) with the BS when they are in the idle mode. The UE may be, for example, a smartphone, a tablet, a mobile computer, a machine to machine (M2M) device, a terminal, a mobile device, an Internet of Things (IoT) device, and so on.

Embodiments of the disclosed technology include the base station (or network device, eNodeB, gNB, and so on) configuring the dedicated resources required for RRC idle mode (also referred to as the RRC idle state, or simply idle state or idle mode) data transmission, and the terminals using those terminal-specific dedicated resources to perform communication with the base station.

In some embodiments, the pre-configured dedicated resources used by the UE include at least one of the following:

(a) an RRC idle state data transmission mode UE dedicated search space (USS_IDLE), which involves monitoring timing of the PDCCH (physical downlink control channel) to be accurate to milliseconds or subframe boundaries;

(b) RRC idle state data transmission mode UE dedicated search space (USS_IDLE) monitoring duration (USS_IDLE Monitoring Window Length);

(c) RRC idle state data transmission mode UE dedicated search space (USS_IDLE) monitoring start time (USS_IDLE_START), whose timing should be accurate to the second or wireless frame (SFN) boundary, and may further be accurate to milliseconds or subframe boundaries;

(d) Dedicated PUSCH (physical uplink shared channel) resource for RRC idle state data transmission (dedicated PUSCH scheduling information);

(e) Contention Free Random Access Resource (CFRA) for RRC idle state data transmission; and (f) Start time of dedicated PUSCH resources and/or CFRA resources, wherein the start time of the PUSCH resource is accurate to a millisecond or a subframe boundary, and the start time of the CFRA resource is accurate to a second or a wireless radio frame (SFN) boundary.

In some embodiments, the parameter configuration mode is related to the trigger mode of the RRC Connection Release, as described in the context of FIGS. 2-7.

Figure 2:
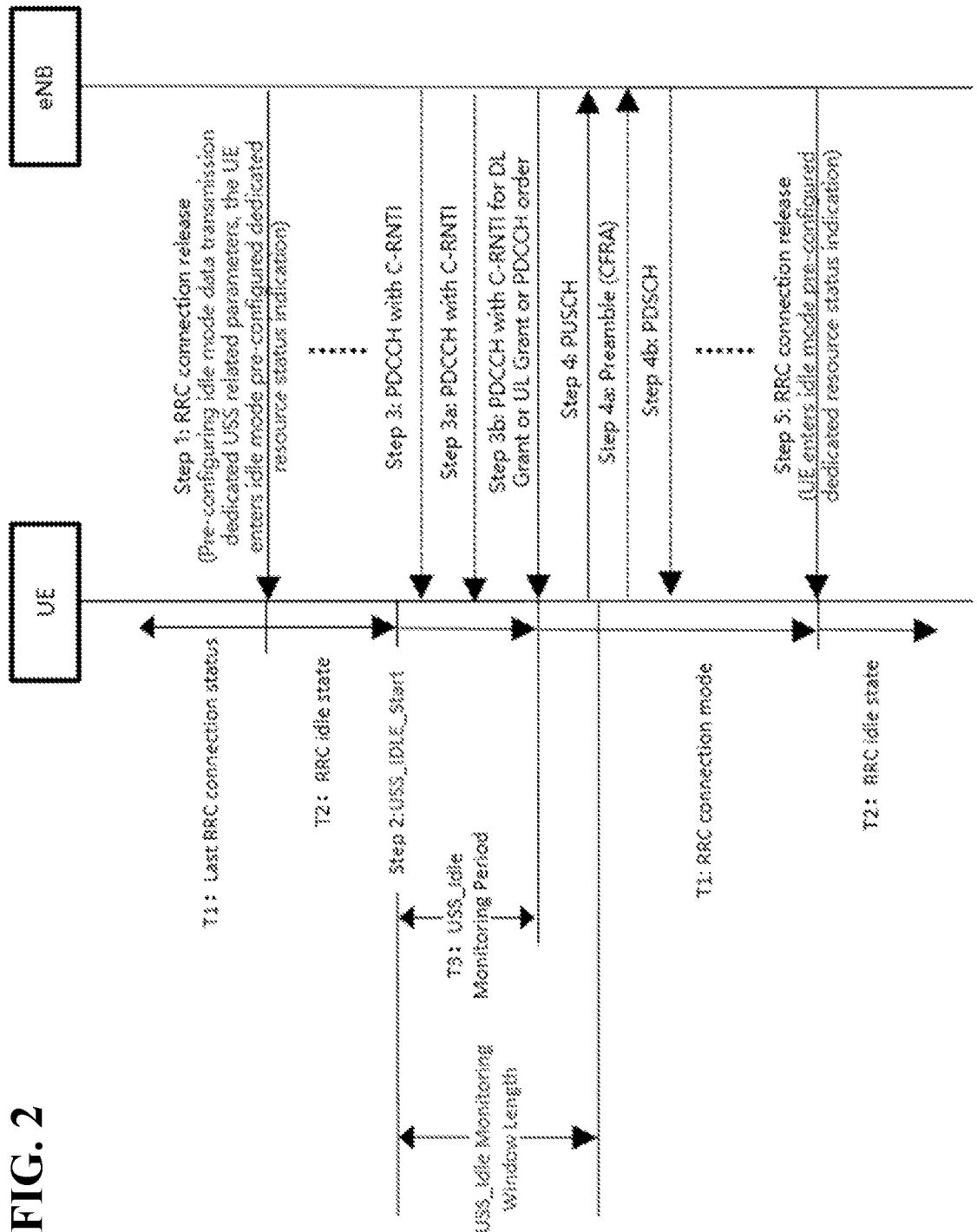
FIG. 2 shows an example message/timing diagram of an implementation of idle mode data transfer with pre-configured dedicated search spaces.

FIG. 2 shows an example message/timing diagram of an implementation of idle mode data transfer with pre-configured dedicated search spaces. As shown in FIG. 2, the example message and timing diagram includes:

Step 1: The idle mode dedicated search space related parameter is carried in the RRC connection release message or the accompanying MAC CE, and the UE enters an idle mode pre-configured dedicated resource status indication. This is the end of the T1 period and the start of the T2 period, wherein the UE enters idle mode with a pre-configured dedicated resource state indication, which is used to indicate that the UE in idle mode pre-configured UE-specific dedicated resource state can perform information transmission and reception, and the idle mode dedicated search space related parameter is used for idle mode dedicated search space PDCCH monitoring for data transmission.

The RRC connection release message includes at least one of the following:
RRCConnectionRelease
RRCEarlyDataComplete
Other RRC release messages that may be newly introduced In some embodiments, the pre-configured idle mode dedicated search space related parameters include at least one of the following:

An RRC idle state data transmission mode UE-specific search space (USS_IDLE)
An RRC idle state data transmission mode UE-specific search space (USS_IDLE) monitoring maximum duration (USS_IDLE Monitoring Window Length)
An RRC idle state data transmission mode UE dedicated search space (USS_IDLE) start monitoring time (USS_IDLE_START)

The USS_IDLE parameter includes: a parameter used to determine a USS_IDLE PDCCH monitoring start timing (subframe), a USS_IDLE PDCCH monitoring interval, and a USS_IDLE PDCCH monitoring repetition number.

In some embodiments, the parameters used to determine the USS_IDLE PDCCH monitoring start timing (subframe) can be determined in one of the following ways:

By configuring the PDCCH monitoring start timing offset, using the npdcch-Offset-USS parameter (which is usually used to decide the location of UE-specific search space (USS) PDCCH monitoring starting subframe in the connected mode), the UE calculates the PDCCH monitoring start timing (subframe) based on the PDCCH monitoring start timing offset.

By configuring a PDCCH monitoring cycle and a number of PDCCH monitoring starting points in a PDCCH monitoring period, the UE calculates the PDCCH monitoring start timing (subframe) based on the configured parameters and UE-ID. Specifically, the PDCCH monitoring period can be 1/n or n times of the paging DRX cycle, wherein n is a positive integer, and UE calculate the PDCCH monitoring starting subframe with the same way as to calculate the CSS-Paging motoring Occasion.

Pre-configured idle mode UE-specific search space (USS_IDLE) monitoring start time (subframe)-determined parameters (e.g., based on at least one of the following parameter configurations to determine the monitoring start timing of PDCCH monitoring: H-SFN-Start, SFN-Start, SubFrame-Start).

In some embodiments, the parameters used to determine the USS_IDLE monitoring PDCCH interval can be determined in one of the following ways:

The UE-specific search space (USS) in the connected mode determines the parameter of the PDCCH monitoring interval (npdcch-StartSF-USS)

A pre-configured idle mode UE-specific search space (USS_IDLE) determines the parameters of the PDCCH monitoring interval (npdcch-StartSF-USS_Idle)

A pre-configured interval of the idle mode UE-specific search space (USS_IDLE) (e.g., the number of PDCCH cycles, or the number of SFNs, or the number of other expression time lengths)

In some embodiments, the parameter used by USS_IDLE to monitor the number of PDCCH repetitions may be one of the following:

A UE-specific search space (USS) PDCCH repetition number (npdcch-NumRepetitions) in connected mode A re-configured idle-mode UE-specific search space (USS_IDLE) PDCCH repetitions (npdcch-NumRepetitions-USS_IDLE)

In some embodiments, and in the RRC idle state data transmission mode, the maximum monitoring time (USS_IDLE Monitoring Window Length) of the UE-specific search space (USS_IDLE) can be pre-configured by the time window length in seconds, using a timer, or predefined by network standardization, etc.

In some embodiments, and in the RRC idle state data transmission mode, the monitoring start time (USS_IDLE_START) of the UE-specific search space (USS_IDLE) can be defined by relative time (e.g., using a timer) or absolute time.

When using relative time, the timer starts counting from a certain moment (for example, when the eNB sends an RRC connection release message or the UE receives the RRC connection release message), and then starts to monitor the PDCCH in USS_IDLE after a certain length of time. The timer can be in seconds, hours, etc.

When using absolute time, the absolute time is a pre-configuration start monitoring time, for example: a certain time on a certain day in a certain month of a certain year. This absolute time may be H-HSFN_Start, H-SFN_Start or SFN_Start. The system message broadcast H-HSFN information is required in the H-HSFN_Start mode. The H-HSFN is a time period in units of H-SFN periods. Generally, one H-HSFN contains 1024 H-SFNs.

Step 2: The UE starts PDCCH monitoring according to the PDCCH monitoring timing, and the monitoring interval defined by the "USS_IDLE parameter" in the "USS_Idle Monitoring Window Length" period begins at "USS_IDLE_START". This is the end of the T2 period and the beginning of the T3 period.

Step 3: The UE monitors the PDCCH, but does not monitor its own PDCCH.

Step 3a: The UE monitors the PDCCH, but does not monitor its own PDCCH.

In some embodiments, since the UE monitors its own dedicated PDCCH, the contention resolution is completed successfully or the UE identification is completed successfully, and the UE enters RRC_CONNECTED state. Thus, the UE ends the PDCCH monitoring of the USS_IDLE in advance, and starts monitoring the PDCCH of the connected mode USS. That is to say, the USS_IDLE PDCCH monitoring end time is when the USS_IDLE Monitoring Window Length expires, or the dedicated PDCCH is monitored, whichever is first.

Step 4: If the PDCCH carried in Step 3b is a UL Grant, the UE sends the PUSCH on the resource scheduled by the UL Grant.

Step 4a: If the PDCCH carries a PDCCH Order in Step 3b, the UE sends a Preamble (triggering the PRACH procedure).

Step 4b: If the PDCCH carries a DL Grant in Step 3b, the UE monitors the PDSCH on the DL Grant scheduled resource.

Step 5: The UE enters the idle mode pre-configured dedicated resource state upon receiving the RRC connection release message with a pre-configured dedicated resource indication. Here, the UE can perform information transmission and reception in the idle mode pre-configured UE-specific dedicated resource location. The T1 period ends, and the T2 time period begins. At this point, if the current RRC connection release message does not carry pre-configured dedicated resource information, the UE uses the most recent pre-configured dedicated resource information.

In some embodiments, and if the UE receives the RRC connection release message without indicating the UE into the idle mode pre-configuration dedicated resource state, the UE releases the pre-configured dedicated resource.

Figure 3:
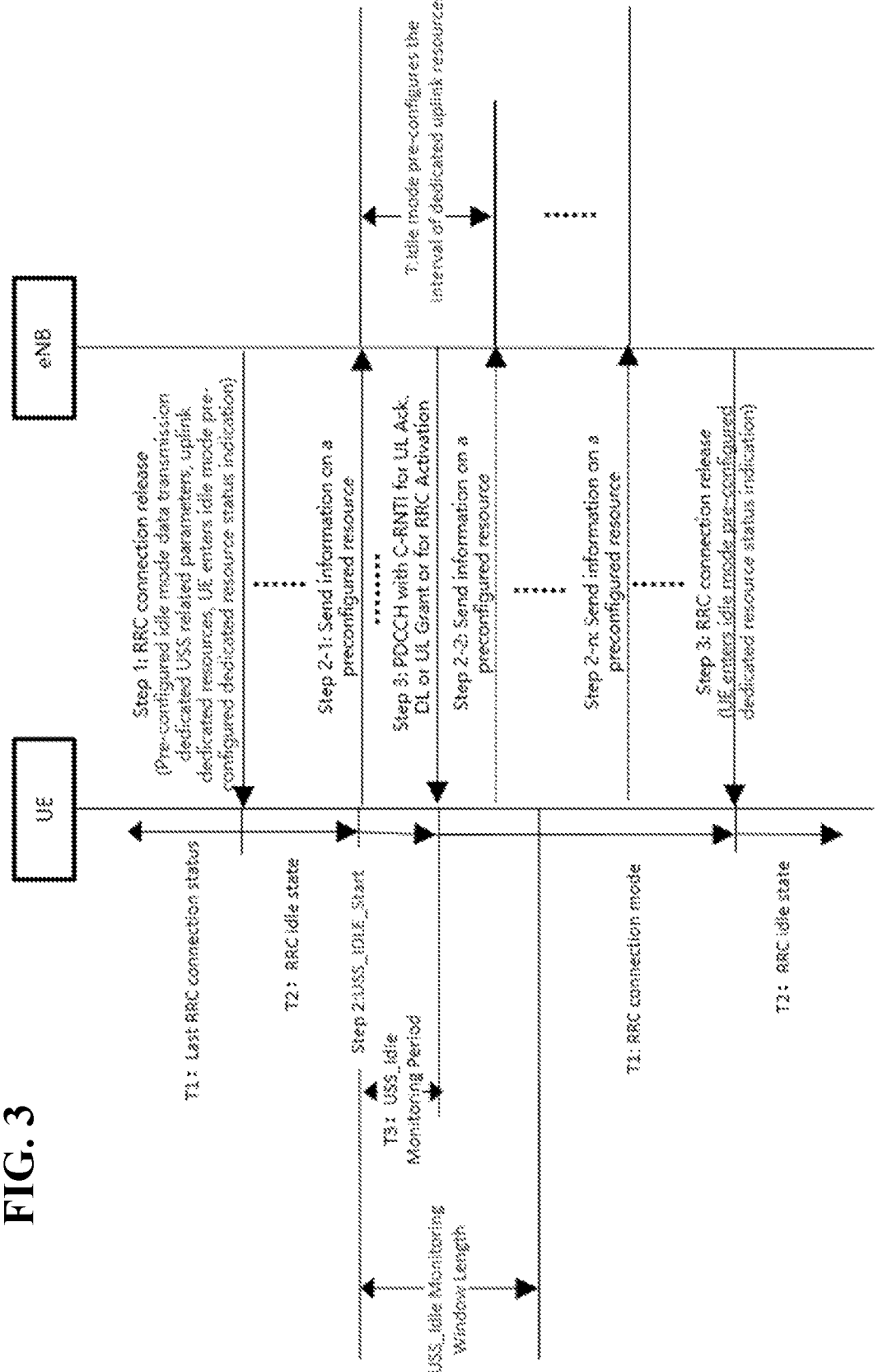
FIG. 3 shows an example message/timing diagram of an implementation of idle mode data transfer with pre-configured dedicated search spaces and uplink dedicated resources.

FIG. 3 shows an example message/timing diagram of an implementation of idle mode data transfer with pre-configured dedicated search spaces and uplink dedicated resources. As shown in FIG. 3, the example message and timing diagram includes:

Step 1: The idle mode dedicated search space related parameter idle mode uplink dedicated resource related configuration are carried in the RRC connection release message or the accompanying MAC CE, and the UE enters the idle mode with a pre-configured dedicated resource status indication. This is the end of the T1 period and beginning of the T2 period, wherein: the UE enters an idle mode with a pre-configured dedicated resource status indication, which is used to indicate the UE in idle mode pre-configured UE-specific dedicated resource location for information transmission and reception. The idle mode uplink UE-specific dedicated resource related configuration is used for the idle mode uplink information transmission; and idle mode dedicated search space related parameters are used for dedicated search space PDCCH monitoring of idle mode data transmission.

The RRC connection release message includes at least one of the following:
- RRCConnectionRelease
- RRCEarlyDataComplete
- Other RRC release messages that may be newly introduced In some embodiments, the uplink dedicated resource configuration message includes at least one of the following:
- Idle mode pre-configured dedicated uplink PUSCH resource scheduling information, which includes scheduling information of the uplink PUSCH transmission, and includes at least: CarrierIndex, SubCarrierindex, ResourceAssignment, ModulationAndCodingScheme, and/or RepetitionNumber.
- Idle mode pre-configured dedicated uplink CFRA resource information, which includes uplink CFRA resource information, including at least: CarrierIndex, ResourceIndex (CEL), and/or SubCarrierIndex.
- An initial timing of pre-configured dedicated uplink resources in idle mode
- An interval for pre-configuring dedicated uplink resources in idle mode, which may consist of an interval for pre-configuring dedicated uplink resources in idle mode, e.g., a resource interval for pre-configuring multiple uplink PUSCH resources, or a resource interval when multiple CFRA resources are pre-configured. If the parameter is configured, the idle mode pre-configured dedicated uplink resource starts from the start time of the idle mode pre-configured dedicated uplink resource, and the idle mode dedicated uplink resource occasion occurs every interval of the "idle mode pre-configured dedicated uplink resource interval" interval. In FIG. 3, the interval "T: idle mode pre-configured dedicated uplink resource interval" is used, and uplink information is transmitted on the pre-configured dedicated resource.
- A number of dedicated uplink resources pre-configured in idle mode (or number of TB blocks), which may include the number of pre-configured resources used to pre-configure multiple uplink PUSCH resources. If the parameter is configured, the idle mode pre-configured dedicated uplink resource starts from the start time of the idle mode pre-configured dedicated uplink resource, and the idle mode dedicated uplink resource occasion occurs every interval of the "idle mode pre-configured dedicated uplink resource interval" interval. The uplink pre-configured resource ends until the number of resources equals the number of idle mode pre-configured dedicated uplink resources. In FIG. 3, the interval "T: idle mode pre-configured dedicated uplink resource interval" is used, the uplink information is sent once on the pre-configured dedicated resource, and the uplink pre-configured resource ends after n times of transmission, wherein n is the "idle mode pre-configuration" number of dedicated uplink resources.

Furthermore, in idle mode, the initial timing of pre-configuring dedicated uplink resources can be defined by relative time (timer), absolute time or relative time+absolute time.

When using relative time, the timer starts from a certain time (such as when the eNB sends an RRC connection release message or the UE receives the RRC connection release message), and starts to monitor the PDCCH in the USS_IDLE or send uplink information on the pre-configured dedicated uplink resources after a certain length of time. The timer can be seconds, hours, radio frames, etc.

When using absolute time, the absolute time is a pre-configuration start monitoring time. For example, a certain time of a certain day in a certain month, a certain millisecond of a certain time on a certain day of the month, or a certain time of the week. This certain time is H-HSFN_Start/H-SFN_Start/SFN_Start/SubFrame_Start. The system message broadcast H-HSFN information is required in the H-HSFN_Start mode. The H-HSFN is a time period in units of H-SFN periods. Generally, one H-HSFN contains 1024 H-SFNs.

When using relative time+absolute time, a pre-configured idle mode pre-configured dedicated uplink resource starts at a certain time point (such as when the eNB sends an RRC connection release message or the UE receives the RRC connection release message) plus an offset value, which may be a certain time period (e.g., based on a timer), the first H-SFN_Start, SFN_Start, or SubFrame_Start position, the first H-SFN_Start, SFN_Start, or SubFrame_Start position after a certain month of the year, and so on.

The initial timing of the dedicated uplink resource may also be an offset relative to the USS_IDLE_Start (for example, the initial timing may be the same as the start time of USS_IDLE_Start, or it may be a pre-configured time before the start time USS_IDLE_Start), or the pre-configured duration or standard predefined duration may be deferred from the USS_IDLE_Start.

In some embodiments, the pre-configured idle mode dedicated search space related parameters include at least one of the following:
- An RRC idle state data transmission mode UE-specific search space (USS_IDLE)
- An RRC idle state data transmission mode UE-specific search space (USS_IDLE) monitoring maximum duration (USS_Idle Monitoring Window Length)
- An RRC idle state data transmission mode UE dedicated search space (USS_IDLE) start monitoring time (USS_IDLE_START)

In some embodiments, the pre-configured idle mode dedicated search space related parameters (USS_IDLE) include at least one of the following: PDCCH start monitoring timing (subframe), a USS_IDLE monitoring PDCCH interval parameter, and a USS_IDLE monitoring PDCCH repetition number.

In some embodiments, the parameters used to determine the USS_IDLE monitoring PDCCH start monitoring timing (subframe) can be determined in one of the following ways:
- Configure the PDCCH monitoring start timing offset (especially use the npdcch-Offset-USS parameter (which is used usually to decide the location of UE-specific search space (USS) PDCCH monitoring starting subframe in the connected mode), UE calculates the PDCCH monitoring start timing (subframe) based on the PDCCH monitoring start timing offset.
- Configure a PDCCH monitoring cycle and a number of PDCCH monitoring starting points in a PDCCH monitoring period, UE calculates the PDCCH monitoring start timing (subframe) based on the configured parameters and UE-ID. Specifically, the PDCCH monitoring period can be 1/n or n times of the paging DRX cycle, wherein n is a positive integer, and UE calculate the PDCCH monitoring starting subframe with the same way as to calculate the CSS-Paging motoring Occasion.

Pre-configured idle mode UE-specific search space (USS_Idle) monitoring start time (subframe)-determined parameters (e.g., based on at least one of the following parameter configurations to determine the monitoring start time (subframe) of PDCCH monitoring: H-SFN-Start, SFN-Start, SubFrame-Start)

Pre-configured offset relative to the initial timing of the dedicated uplink resource start timing (for example, the initial timing may be the same as the start time of the idle mode pre-configured dedicated uplink resource, or it may be a pre-configured time before the start time of the idle mode pre-configured dedicated uplink resource, or the pre-configured duration or standard predefined duration may be deferred from the start of the idle mode pre-configured dedicated upstream resource).

In some embodiments, the parameters used to determine the USS_IDLE monitoring PDCCH interval can be determined in one of the following ways:

The UE-specific search space (USS) in the connected mode determines the parameters of the PDCCH monitoring interval (npdcch-StartSF-USS)

A pre-configured idle mode UE-specific search space (USS_Idle) determines the parameters of the PDCCH monitoring interval (npdcch-StartSF-USS_Idle)

A pre-configured the interval of the idle mode UE-specific search space (USS_IDLE) (e.g., the number of PDCCH cycles, the number of SFNs, or the number of other expression time lengths)

A pre-configured PDCCH monitoring cycle

The parameter used by USS_IDLE to monitor the number of PDCCH repetitions can be one of the following:

A UE-specific search space (USS) PDCCH repetition number (npdcch-NumRepetitions) in connected mode Pre-configured idle-mode UE-specific search space (USS_Idle) PDCCH repetitions (npdcch-NumRepetitions-USS_Idle)

In some embodiments, and in RRC idle state data transmission mode, the maximum monitoring time (USS_Idle Monitoring Window Length) of the UE-specific search space (USS_IDLE) can be pre-configured by the time window length in seconds, timers, etc., or predefined by network standardization, etc.

In some embodiments, and in RRC idle state data transmission mode, the start monitoring time (USS_IDLE_START) of the UE-specific search space (USS_IDLE) can be defined by relative time (timer) or absolute time.

The timer starts counting from a certain moment (such as the eNB sends an RRC connection release message or the UE receives the RRC connection release message), and then starts to monitor the PDCCH in USS_IDLE after a certain length of time (the timer can be in seconds, hours, etc.)

The absolute time is a pre-configuration start monitoring time. For example, it may be a certain time in a certain month of a certain year, a certain time in a certain month of a certain year, or a certain time on a certain day of the month, a certain time of the month, a certain time of the day, or H-HSFN_Start/H-SFN_Start/SFN_Start. The system message broadcast H-HSFN information is required in H-HSFN_Start mode. The H-HSFN is a time period in units of H-SFN periods. Generally, one H-HSFN contains 1024 H-SFNs.

Step 2: The UE starts PDCCH monitoring according to the PDCCH monitoring timing and the monitoring interval defined by the "USS_IDLE parameter" in the "USS_Idle Monitoring Window Length" period in the "USS_IDLE_START". This is the end of the T2 period and the beginning of the T3 period.

Step 2-1: The UE sends uplink information on the pre-configured resource.

Furthermore, Step 2 and Step 2-1 timing can be the same, Step 2 can be pre-configured before Step 2-1 or for a standard predefined duration, or Step 2 can be later than Step 2-1 pre-configured duration or for a standard predefined duration.

The uplink information includes at least one of the following pieces of information:

BSR, NAS PDU, User Data PDU, RRCConnectionRequest, RRCConnectionResumeRequest, RRCConnectionReestablishmentRequest, RRCEarlyDataRequest, C-RNTI MAC CE, or service type indication requested by the UE.

Step 3: The UE monitors its own PDCCH, performs subsequent operations based on the scheduling information (UL Grant/DL Grant/PDCCH Order, etc.) included in the PDCCH, and enters the RRC connection mode. This is the end of the T3 period and the start of the T1 period.

Step 2-2: If the idle mode dedicated resource pre-configuration parameter includes the "interval mode pre-configured dedicated uplink resource interval", the idle mode pre-configured dedicated uplink resource starts from Step 2, and each interval has an "idle mode pre-configured dedicated uplink resource", then the idle mode dedicated uplink resource timing occurs in each interval. (In FIG. 3, the interval is the period "T: idle mode pre-configured dedicated uplink resource interval", and the uplink information is sent on the pre-configured dedicated resource.)

Step 2-n: If the idle mode dedicated resource pre-configuration parameter includes "the number of idle mode pre-configured dedicated uplink resources", the idle mode pre-configured dedicated uplink resource starts from Step 2, and each interval has an "idle mode pre-configured dedicated uplink resource", then the idle mode dedicated uplink resource timing occurs once (e.g., at the start) until the number of idle mode pre-configured dedicated uplink resources occur, and the uplink pre-configured resource ends. In FIG. 3, the interval is the period "T: idle mode pre-configured dedicated uplink resource interval", the uplink information is sent once on the pre-configured dedicated resource, and the uplink pre-configured resource ends after n transmissions, wherein n is the number of dedicated uplink resources specified in the "idle mode pre-configuration".

Step 3: The UE receives the RRC connection release message, enters the idle mode pre-configured dedicated resource status indicated in the RRC connection release message, and performs the information transmission and reception in the idle mode pre-configured dedicated resource location. This is the end of the T1 period and the start of the T2 period. If the current RRC connection release message does not carry the pre-configured dedicated resource information, the UE uses the most recent pre-configured dedicated resource information.

In some embodiments, and if the UE receives the RRC connection release message without indicating the UE into the idle mode pre-configuration dedicated resource status, the UE releases the pre-configured dedicated resource.

Figure 4:
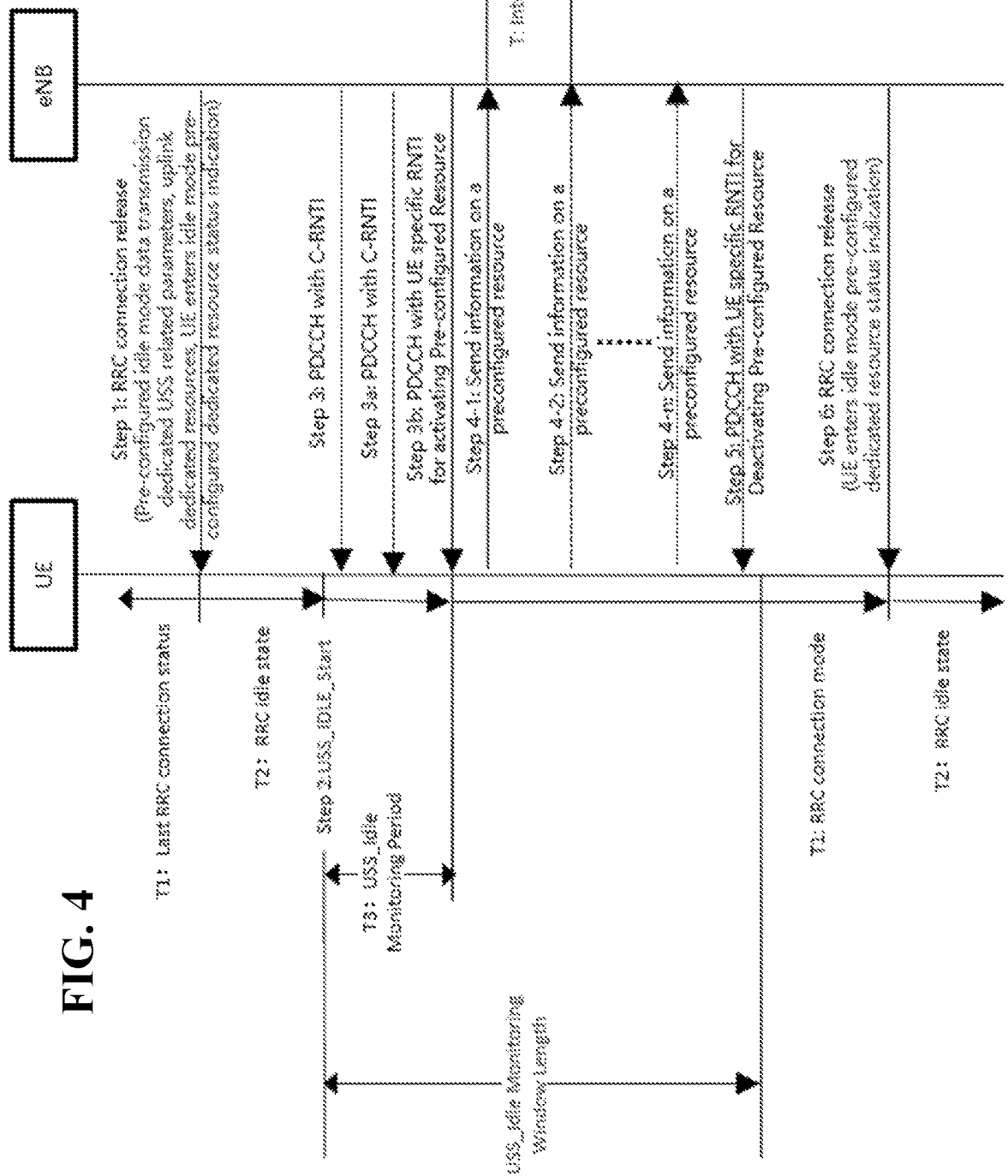
FIG. 4 shows an example message/timing diagram of an implementation of idle mode data transfer with pre-configured dedicated search spaces and uplink dedicated resources, with the dedicated resources being activated through downlink control information (DCI).

FIG. 4 shows an example message/timing diagram of an implementation of idle mode data transfer with pre-configured dedicated search spaces and uplink dedicated resources, with the dedicated resources being activated through downlink control information (DCI). As shown in FIG. 4, the example message and timing diagram includes:

This example is equivalent to the combination described in FIG. 2 and FIG. 3. The PDCCH DCI in FIG. 2 configures an uplink resource, whereas in FIG. 3, the uplink resource interval is pre-configured. In this example, the uplink resource interval is pre-configured and the DCI activates/deactivates the uplink resource.

Step 1: The idle mode dedicated search space related parameter is carried in the RRC connection release message or the accompanying MAC CE, and idle mode uplink dedicated resource period is configured, and the UE enters the idle mode with a pre-configured dedicated resource status indication. This is the end of the T1 period and the beginning of the T2 period, wherein: the UE enters an idle mode with a pre-configured dedicated resource status indication, which is used to indicate that the UE idle mode pre-configured UE-specific dedicated resource location for information transmission and reception. The idle mode uplink dedicated resource period is used for pre-configuration of the resource interval when dedicated resource blocks are used, and idle mode dedicated search space related parameters are used for dedicated search space PDCCH monitoring of idle mode data transmission.

The RRC connection release message includes at least one of the following:
RRCConnectionRelease
RRCEarlyDataComplete
Other RRC release messages that may be newly introduced In some embodiments, the pre-configured idle mode dedicated search space related parameters include at least one of the following:
An RRC idle state data transmission mode UE-specific search space (USS_IDLE)
An RRC idle state data transmission mode UE-specific search space (USS_IDLE) monitoring maximum duration (USS_IDLE Monitoring Window Length)
An RRC idle state data transmission mode UE dedicated search space (USS_IDLE) start monitoring time (USS_IDLE_START)

The USS_IDLE parameter includes: a parameter used to determine a USS_IDLE monitoring PDCCH start monitoring timing (subframe), a USS_IDLE monitoring PDCCH interval parameter, and a USS_IDLE monitoring PDCCH repetition number.

In some embodiments, the parameters used to determine the USS_IDLE monitoring PDCCH start monitoring timing (subframe) can be determined in one of the following ways:
Configure the PDCCH monitoring start timing offset (especially use the npdcch-Offset-USS parameter (which is used usually to decide the location of UE-specific search space (USS) PDCCH monitoring starting subframe in the connected mode), UE calculates the PDCCH monitoring start timing (subframe) based on the PDCCH monitoring start timing offset.
Configure a PDCCH monitoring cycle and a number of PDCCH monitoring starting points in a PDCCH monitoring period, UE calculates the PDCCH monitoring start timing (subframe) based on the configured parameters and UE-ID. Specifically, the PDCCH monitoring period can be 1/n or n times of the paging DRX cycle, wherein n is a positive integer, and UE calculate the PDCCH monitoring starting subframe with the same way as to calculate the CSS-Paging motoring Occasion.

Pre-configured idle mode UE-specific search space (USS_IDLE) monitoring start time (subframe)-determined parameters (e.g., based on one of the following parameter configurations to determine the monitoring start timing of PDCCH monitoring: H-SFN-Start, SFN-Start, SubFrame-Start).

In some embodiments, the parameters used to determine the USS_IDLE monitoring PDCCH interval can be determined in one of the following ways:
The UE-specific search space (USS) in the connected mode determines the parameter of the PDCCH monitoring interval (npdcch-StartSF-USS)
A pre-configured idle mode UE-specific search space (USS_IDLE) determines the parameters of the PDCCH monitoring interval (npdcch-StartSF-USS_Idle)
A pre-configured interval of the idle mode UE-specific search space (USS_IDLE) (e.g., the number of PDCCH cycles, or the number of SFNs, or the number of other expression time lengths)

In some embodiments, the parameter used by USS_IDLE to monitor the number of PDCCH repetitions may be one of the following:
A UE-specific search space (USS) PDCCH repetition number (npdcch-NumRepetitions) in connected mode
A re-configured idle-mode UE-specific search space (USS_IDLE) PDCCH repetitions (npdcch-NumRepetitions-USS_IDLE)

In some embodiments, and in the RRC idle state data transmission mode, the maximum monitoring time (USS_IDLE Monitoring Window Length) of the UE-specific search space (USS_IDLE) can be pre-configured by the time window length in seconds, using a timer, or predefined by network standardization, etc.

In some embodiments, and in the RRC idle state data transmission mode, the monitoring start time (USS_IDLE_START) of the UE-specific search space (USS_IDLE) can be defined by relative time (e.g., using a timer) or absolute time.
When using relative time, the timer starts counting from a certain moment (for example, when the eNB sends an RRC connection release message or the UE receives the RRC connection release message), and then starts to monitor the PDCCH in USS_IDLE after a certain length of time The timer can be in seconds, hours, etc.
When using absolute time, the absolute time is a pre-configuration start monitoring time, for example: a certain time on a certain day in a certain month of a certain year. This absolute time may be H-HSFN_Start, H-SFN_Start or SFN_Start. The system message broadcast H-HSFN information is required in the H-HSFN_Start mode. The H-HSFN is a time period in units of H-SFN periods. Generally, one H-HSFN contains 1024 H-SFNs.

Step 2: The UE starts PDCCH monitoring according to the PDCCH monitoring time and the monitoring interval defined by the "US S_IDLE parameter" in the "USS_Idle Monitoring Window Length" period in the "USS_IDLE_START". This is the end of the T2 period and the beginning of the T3 period.

In some embodiments, the uplink information includes at least one of the following pieces of information:
BSR, NAS PDU, User Data PDU, RRCConnectionRequest, RRCConnectionResumeRequest, RRCConnectionReestablishmentRequest, RRCEarlyDataRequest, C-RNTI MAC CE, or service type indication requested by the UE.

Step 3: The UE monitors the PDCCH but does not monitor its own PDCCH.

Step 3a: The UE monitors the PDCCH but does not monitor its own PDCCH.

Step 3b: The UE monitors its own PDCCH (the PDCCH scrambled with the UE-Specific RNTI, which may be a C-RNTI, an SPS-RNTI, or another defined type of RNTI). The T3 period ends, and the T1 period begins.

Step 4-1: The start timing of the pre-configured uplink resource is the timing upon reception of PDCCH or the timing upon reception of PDCCH plus an time offset. From the start timing, UE sends UL information on the UL grant.

Step 4-2 to Step 4-n: The UE sends the uplink information once per interval of the "interval mode pre-configured dedicated uplink resource interval" on the UL Grant based on the scheduling information (UL Grant information) included in the PDCCH as the start time of the pre-configured uplink resource.

In some embodiments, the scheduling information included in the PDCCH in Step 3b may also be DL Grant information. If DL Grant information is included, Step 4-1 to Step 4-n should include the eNB sending information to the UE on the pre-configured resource.

Step 5: If the UE receives the PDCCH indication that the pre-configured resource is deactivated, the uplink pre-configured dedicated resource is released.

Step 6: The UE receives the RRC connection release message, and enters the idle mode with a pre-configuration UE-specific dedicated resource status indication in the RRC connection release message, and performs the information transmission and reception in the idle mode pre-configured dedicated resource location. At this point, the T1 period ends, and the T2 period begins. Since the current RRC connection release message does not carry the pre-configured dedicated resource information, the UE uses the most recent pre-configured dedicated resource information.

Figure 5:
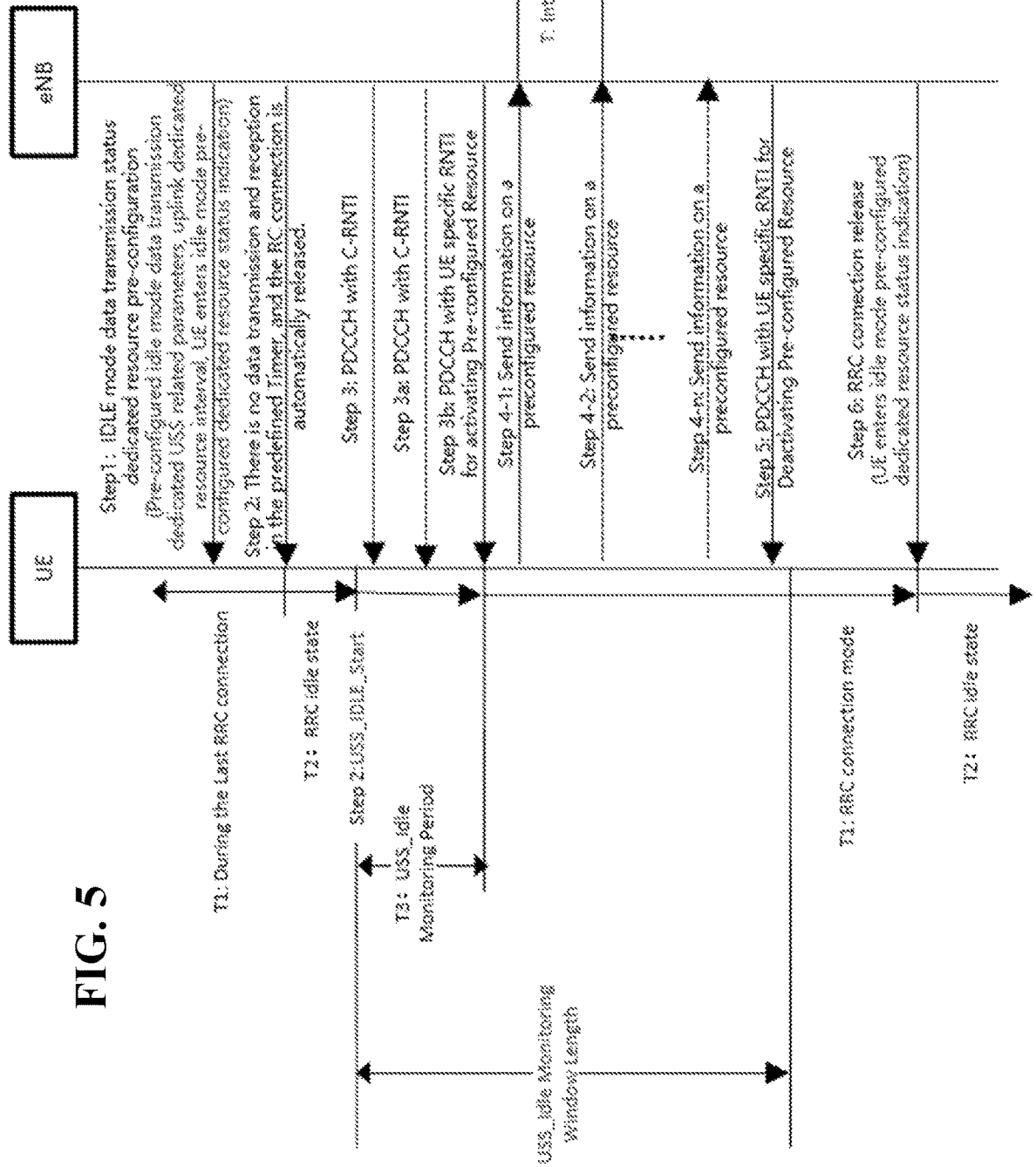
FIG. 5 shows an example message/timing diagram of an implementation of idle mode data transfer with pre-configured dedicated search spaces and uplink dedicated resources, with the dedicated resources being activated through DCI and the RRC Connection being released using a timer.

FIG. 5 shows an example message/timing diagram of an implementation of idle mode data transfer with pre-configured dedicated search spaces and uplink dedicated resources, with the dedicated resources being activated through DCI and the RRC Connection being released using a timer.

The difference between this example and the example shown in FIG. 4 is that when the RRC connection is triggered by the timer, the timer is started when the data is sent or received. If the timer expires and there is no new uplink and downlink data transmission and reception, it enters the idle state. Since there is no explicit message interaction when the UE releases the pre-configured resources (pre-configured idle mode data transmission dedicated USS related parameters and uplink dedicated resource interval), the UE enters the idle mode with a pre-configured dedicated resource status indication, which can only be configured to the UE in advance during the RRC connection process.

In some embodiments, and in the timer-based RRC connection release policy, the pre-configured dedicated resource information may be configured in any of the following manners:

Send to the terminal through the RRCConnectionSetup message

Send to the terminal through the RRCConnectionResume message

Send to the terminal through the RRCConnectionReestablishment message

Send to the terminal through the RRCEarlyDataComplete message

Send to the terminal through the RRCConnectionReconfiguration message

Send to the terminal through the downlink MAC CE

Send to the terminal through the PDCCH DCI

In some embodiments, the information includes at least one of the following: an idle mode data transmission dedicated USS related parameter, an RRC connection release mode indication, or an idle mode uplink dedicated pre-configured resource.

In some embodiments, the RRC connection release mode indication includes any one of the following: an RRC release and context release, an RRC connection suspension, or an idle mode dedicated resource pre-configuration indication.

Figure 6:
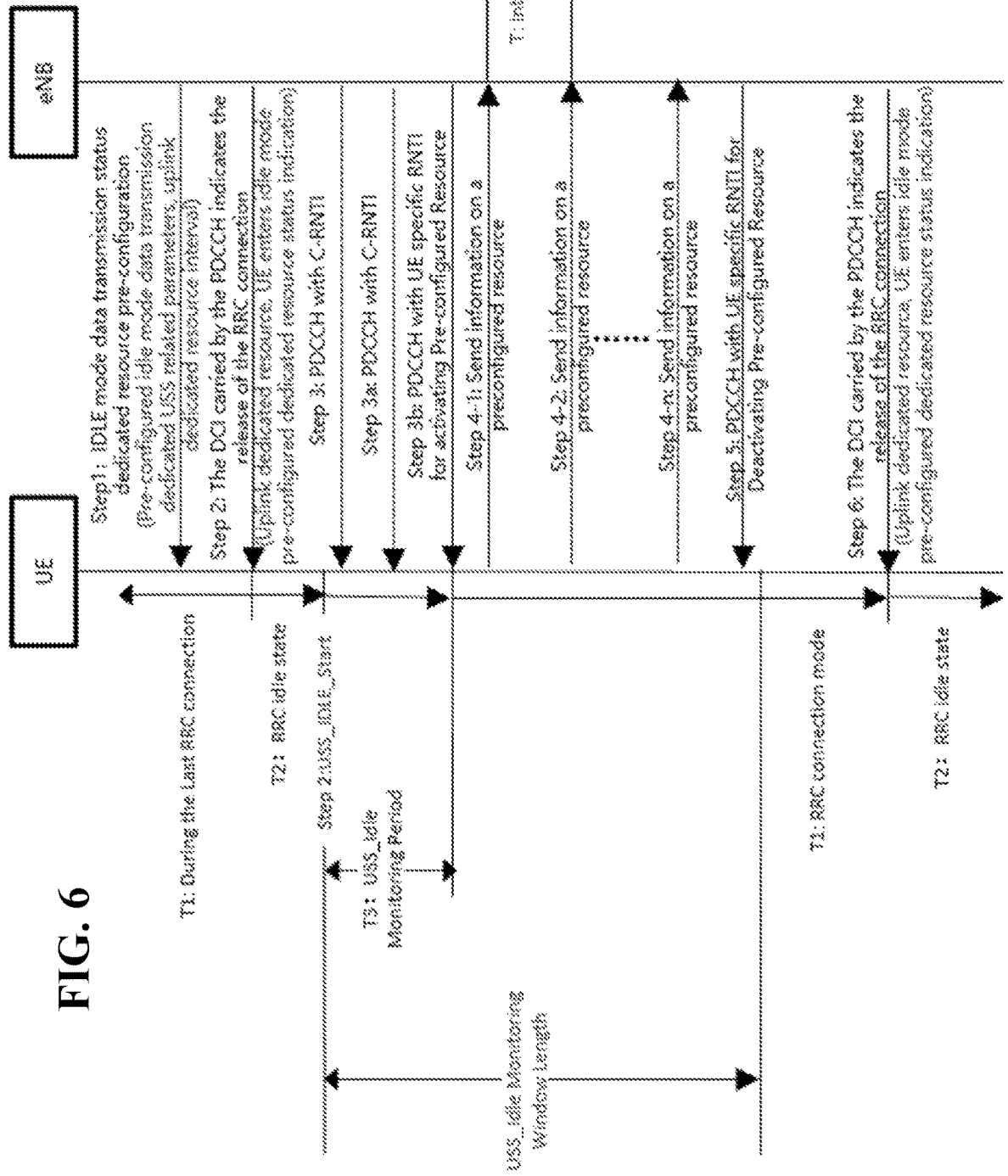
FIG. 6 shows an example message/timing diagram of an implementation of idle mode data transfer with pre-configured dedicated search spaces and uplink dedicated resources, with the dedicated resources being activated through DCI and the RRC Connection being released through DCI triggering.

FIG. 6 shows an example message/timing diagram of an implementation of idle mode data transfer with pre-configured dedicated search spaces and uplink dedicated resources, with the dedicated resources being activated through DCI and the RRC Connection being released through DCI triggering.

The difference between this example and FIG. 5 is that in this example, the DCI can carry a small number of bits of information, such as resource grant information and an RRC connection release mode indication. The difference from FIG. 2 and FIG. 3 is that the DCI can only carry a limited number of bits. Therefore, a part of the pre-configured resource information (such as the USS_IDLE related parameter) may be configured by using an RRC message, a MAC CE, or the like in the RRC connection process, and a part of the information is carried by the DCI.

In this embodiment, if the pre-configured resource information (such as the USS_IDLE related parameter) is configured through an RRC message, a MAC CE, or the like in the RRC connection process, the pre-configured resource may also be explicitly indicated to be released by an RRC message, a MAC CE, or the like.

The RRC message includes a message of at least one of the following:

RRCConnectionSetup

RRCConnectionResume

RRCConnectionReestablishment

RRCConnectionReconfiguration

A newly added message for instructing the UE to enter the RRC connected state, or a message for reconfiguring the radio resource of the RRC connected state.

In some embodiments, the pre-configured dedicated resources that are indicated in the RRC Connection Release message are based on MAC CE triggering. Since the MAC CE can carry more information, when the RRC is triggered by the MAC CE, the pre-configured dedicated resource can be carried in the MAC-CE, or can be configured in advance in the manner shown in FIGS. 2-6.

Figure 7:
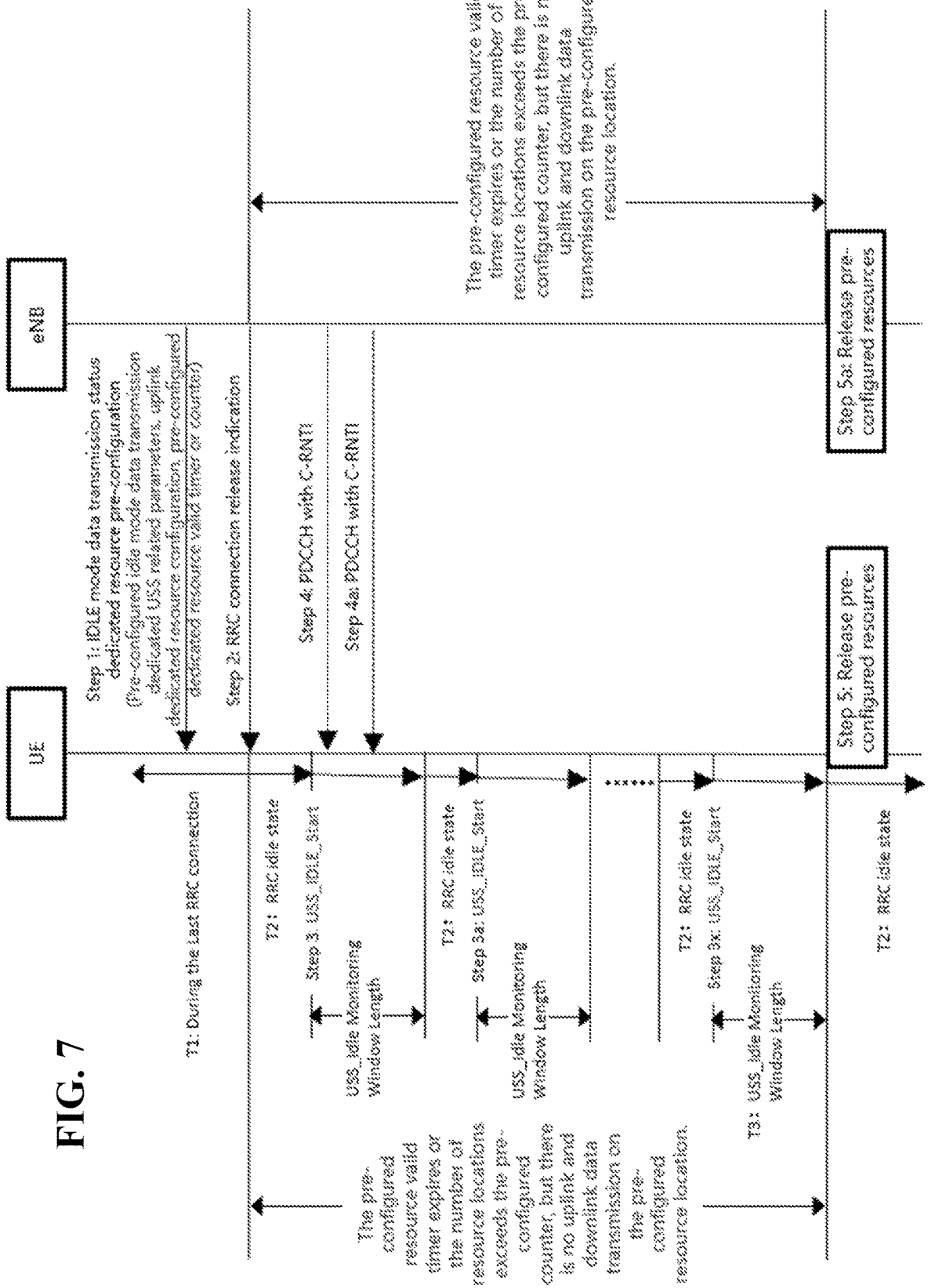
FIG. 7 shows an example message/timing diagram of an implementation of resource release protection.

FIG. 7 shows an example message/timing diagram of an implementation of resource release protection. In this embodiment, when the eNB pre-configures the idle mode dedicated resource to the UE, the eNB configures a resource valid timer or counter of the pre-configured dedicated resource.

In some embodiments, the UE automatically releases the pre-configured dedicated resource if the UE does not use the pre-configured dedicated resource for data transmission and reception within the configured time. The start or restart time of the associated timer may be the timing of pre-configuring dedicated resource (e.g. receiving RRC connection release message carrying the pre-configuring dedicated resource indication), or after the data is transmitted and/or received using the pre-configured dedicated resource.

In some embodiments, and if the UE does not have the uplink and downlink data transmission times on the pre-configured resource location reach the pre-configured effective counter, the configured dedicated resource is automatically released. The number of times that there is no uplink and downlink data transmission at the pre-configured resource location may be the number of times that there is no data transmission and reception on consecutive resource locations, or the total number of times that the data location has no data transmission and reception (e.g., the resource location may be discontinuous, so that the resource data is transmitted and received at intervals).

In some embodiments, the timer or counter of the pre-configured dedicated resource may also be an absolute timer or counter: that is, the pre-configured dedicated resource are valid only in certain duration of time, or the pre-configured resource location is valid only with the pre-configured number, and whether there is data transmission on the resource location is irrelevant.

In some embodiments, the timer or counter is separately maintained at the eNB and the UE side. As shown in FIG. 7, the example message and timing diagram includes:

Step 1: When the dedicated resource is pre-configured to the UE, the effective timer or counter for configuring the pre-configured dedicated resource is configured at the same time.

Step 2: Send an RRC connection release indication to the UE, and the UE enters an RRC idle state. This is the T2 period.

Step 3/3a . . . /3x: In the USS-Idle_Start position, the UE starts monitoring USS_IDLE or sends uplink information on the pre-configured dedicated resource. If neither the PDCCH nor the uplink information is monitored in the timer or counter, the UE automatically releases the pre-configured resource.

Alternatively, the timer may be started in Step 2, and if the timer expires, the pre-configured dedicated resource is automatically released; or, Step 2 starts the counter x, and the UE automatically releases the pre-configured resource after Step 3x.

Step 4/4a: The UE starts monitoring the PDCCH of USS_IDLE.

Step 5: After the timer or counter expires, the UE automatically releases the pre-configured resource.

Step 5a: After the timer or counter expires, the eNB automatically releases the pre-configured resource.

As discussed in the context of FIGS. 2-7, embodiments of the disclosed technology provide numerous advantageous features that include, but are not limited to:

(1) Different RRC release trigger policies and idle mode pre-configured dedicated resource configuration (2) Pre-configured dedicated resource activation timing is determined (accurate to milliseconds or subframes)

Figure 8:
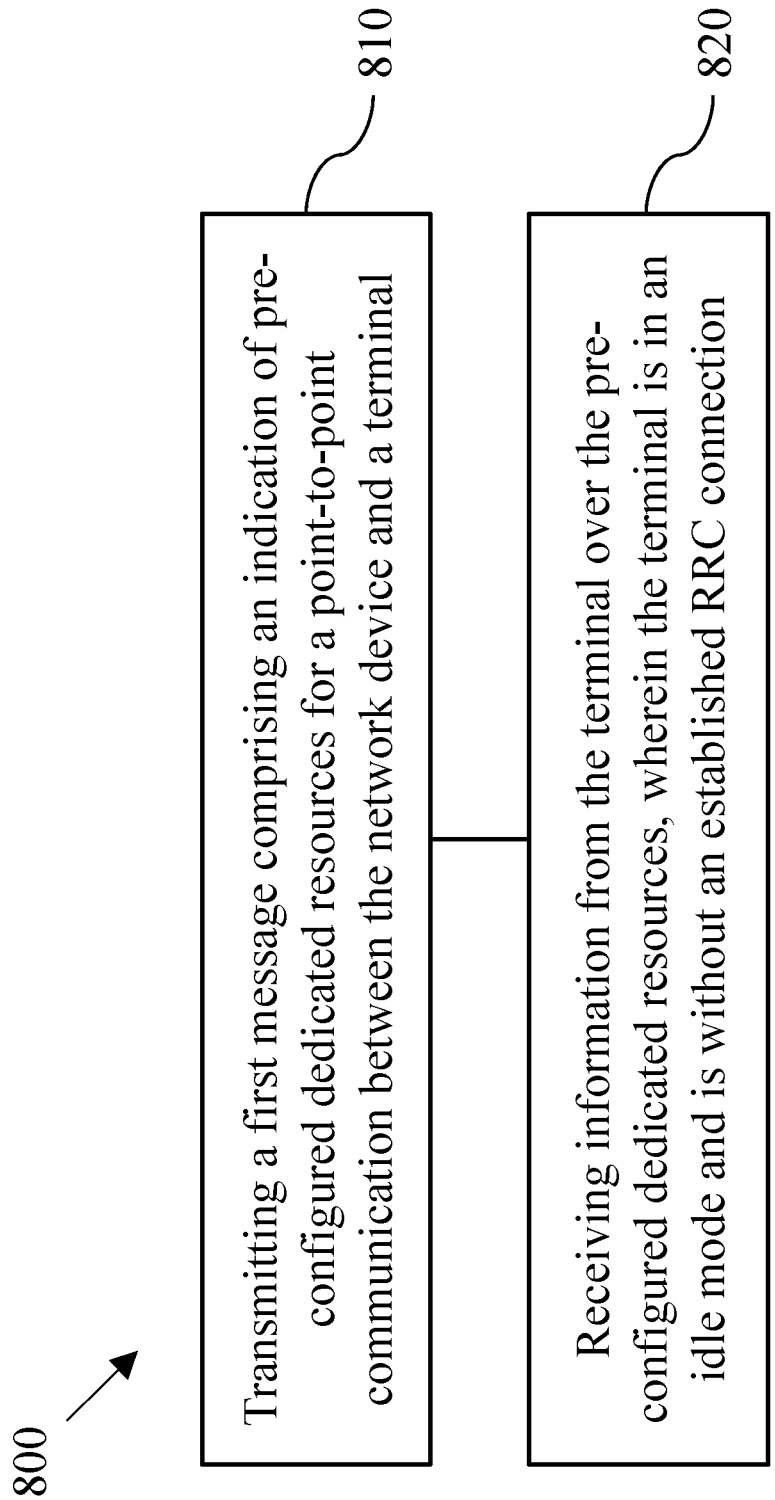
FIG. 8 shows an example of a wireless communication method carried out on a wireless communication apparatus (or user equipment), in accordance with some embodiments of the presently disclosed technology.

(3) Configuration policy for the activation timing related parameters of pre-configured dedicated resources FIG. 8 shows an example of a wireless communication method 800 for idle mode transmissions using pre-configured dedicated resources, which may be implemented at a base station (or network node, network device, eNodeB, gNB, and so on). The method 800 includes, at step 810, transmitting a first message comprising an indication of pre-configured terminal-specific dedicated resources for a communication between the network device and a terminal.

The method 800 includes, at step 820, receiving information from the terminal over the pre-configured terminal-specific dedicated resources, wherein the terminal is in an idle mode and is without an established RRC (radio resource control) connection.

In some embodiments, the method 800 further includes transmitting a second message comprising a trigger that causes the terminal to enter the idle mode. In other embodiments, the first message is communicated during a previous RRC Connection, and the second message comprises instructions for the terminal to release the previous RRC Connection and is communicated subsequent to the first message.

In some embodiments, the method 800 further includes starting an idle mode timer after communicating the information over the pre-configured dedicated resources, and releasing the pre-configured dedicated resources upon determining that the idle mode timer has expired and no additional information was communicated over the pre-configured dedicated resources from a start of the idle mode timer.

In some embodiments, and as described above, the monitoring timing and/or start times of the PDCCH must be accurate to within a millisecond or a subframe. An exemplary implementation for achieving this timing accuracy includes:

(1) Configuring a search space offset of the UE, and the UE calculates a start timing of the PDCCH monitoring based on the offset, in particular, a parameter determined by the UE-specific search space (USS) starting monitoring time in the connected mode (npdcch-Offset-US S);

(2) Configure the PDCCH monitoring period, the number of PDCCH monitoring start positions in the PDCCH monitoring period or the starting position of PDCCH monitoring. If the number of PDCCH monitoring start positions in the PDCCH monitoring period is configured, the network side needs to pre-define a strategy for calculating the PDCCH real position based on the number of PDCCH monitoring start positions in the PDCCH monitoring period and the PDCCH monitoring period. The UE determines the monitoring position of the PDCCH of the UE based on the PDCCH monitoring period, the number of PDCCH monitoring start positions in the PDCCH monitoring period, or the starting position of the PDCCH monitoring, and the UE-ID. The determining manner may be a mode in which the number of the UE-ID and the PDCCH monitoring start position is modulo, and the determining manner needs to ensure that the UE-ID is uniformly distributed to the PDCCH monitoring start position. Specifically, the PDCCH monitoring period may be configured as a factor (multiple or fraction) of the paging monitoring period. For example, the PDCCH monitoring period may be 1/n of the paging monitoring period (the value of n may be a power of 2). The UE calculates a PDCCH monitoring period based on the factor, and determines a PDCCH monitoring location based on the PDCCH monitoring period and a PO calculation policy; and (3) The pre-configured idle mode UE-specific search space (USS_Idle) starts the monitoring timing (subframe) determining parameters (for example, determining the initial monitoring timing (subframe) of the PDCCH monitoring based on the parameter configuration of one of the following: H-SFN-Start, SFN-Start or SubFrame-Start).

Figure 9:
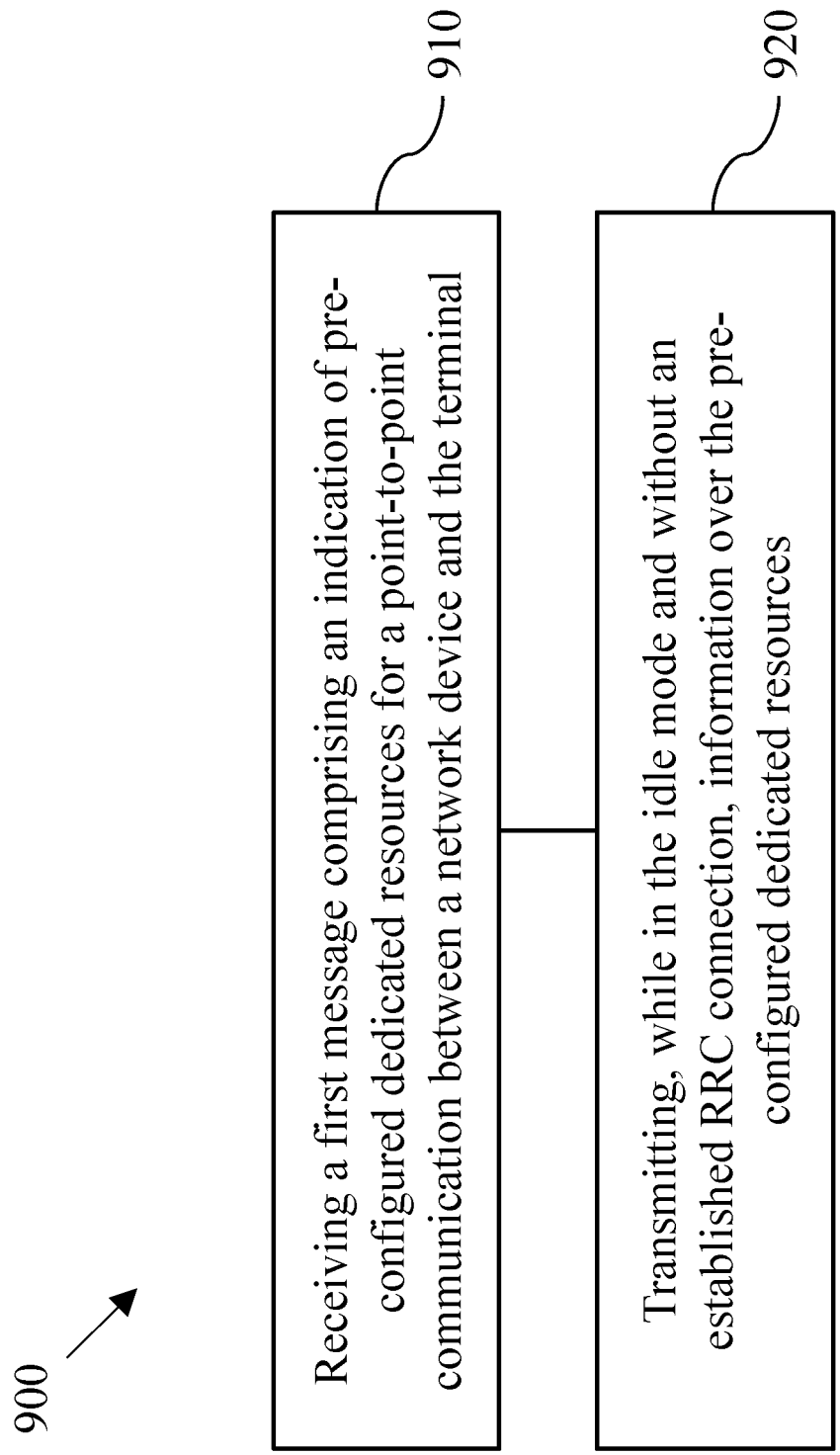
FIG. 9 shows an example of a wireless communication method carried out on a communication node (or network node), in accordance with some embodiments of the presently disclosed technology.

FIG. 9 shows another example of a wireless communication method 900 for idle mode transmissions using pre-configured dedicated resources, which may be implemented at a user equipment (or terminal, mobile device, and so on). This example includes some features and/or steps that are similar to those shown in FIG. 8, and described above. At least some of these features and/or components may not be separately described in this section.

The method 900 includes, at step 910, receiving a first message comprising an indication of pre-configured terminal-specific dedicated resources for a communication between a network device and the terminal.

The method 900 includes, at step 920, transmitting, while in the idle mode and without an established RRC connection, information over the pre-configured dedicated resources.

In some embodiments, the method 900 further includes receiving a second message comprising a trigger, and entering the idle mode based on the trigger.

In some embodiments, the method 900 further includes monitoring a control channel, and receiving, over the control channel, one or more messages comprising an identification. In an example, the identification includes a cell-RNTI (Radio Network Temporary Identifier), and the control channel is a PDCCH (physical downlink control channel). In another example, the pre-configured dedicated resources comprise a dedicated search space that includes monitoring timing of the control channel, which is accurate to at least a millisecond or a subframe boundary.

In some embodiments, and in the context of methods 800 and 900, the pre-configured dedicated resources include a dedicated search space monitoring duration or a dedicated search space monitoring start time, which is accurate to at least a second or a frame boundary. In an example, the dedicated search space monitoring duration is USS_IDLE, and the dedicated search space monitoring start time is USS_IDLE_START.

In some embodiments, and in the context of methods 800 and 900, the pre-configured dedicated resources comprise dedicated PUSCH (physical uplink shared channel) resources or dedicated CFRA (contention free random access) resources. In an example, the pre-configured dedicated resources further comprise a start time of the dedicated PUSCH resource that is accurate to a millisecond or a subframe boundary. In another example, the pre-configured dedicated resources further comprise a start time of the dedicated CFRA resources that is accurate to a second or a radio frame boundary.

In some embodiments, and in the context of methods 800 and 900, the trigger may be defined in different embodiments. In an example, the trigger is based on a downlink control information (DCI). In another example, the trigger is based on a MAC (medium access control) CE (control element). In yet another example, the trigger is based on a timer. In yet another example, the trigger is based on an RRC Connection Release message that comprises at least one an RRCConnectionRelease message, an RRCEarlyDataComplete message or an RRC release message.

Figure 10:
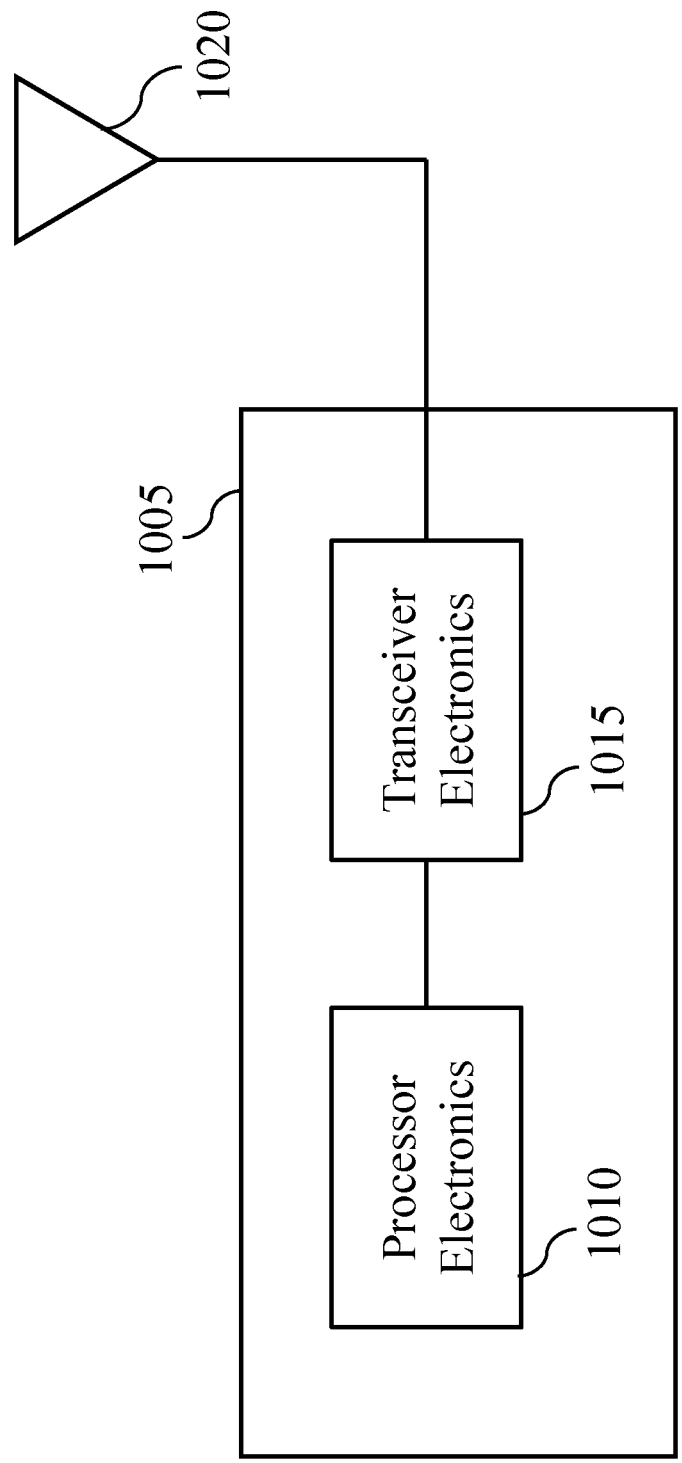
FIG. 10 is a block diagram representation of a portion of an apparatus, in accordance with some embodiments of the presently disclosed technology.

FIG. 10 is a block diagram representation of a portion of an apparatus, in accordance with some embodiments of the presently disclosed technology. An apparatus 1005, such as a base station or a wireless device (or UE), can include processor electronics 1010 such as a microprocessor that implements one or more of the techniques presented in this document. The apparatus 1005 can include transceiver electronics 1015 to send and/or receive wireless signals over one or more communication interfaces such as antenna(s) 1020. The apparatus 1005 can include other communication interfaces for transmitting and receiving data. Apparatus 1005 can include one or more memories (not explicitly shown) configured to store information such as data and/or instructions. In some implementations, the processor electronics 1010 can include at least a portion of the transceiver electronics 1015. In some embodiments, at least some of the disclosed techniques, modules or functions are implemented using the apparatus 1005.

It is intended that the specification, together with the drawings, be considered exemplary only, where exemplary means an example and, unless otherwise stated, does not imply an ideal or a preferred embodiment. As used herein, the singular forms "a", "an" and "the" are intended to include the plural forms as well, unless the context clearly indicates otherwise. Additionally, the use of "or" is intended to include "and/or", unless the context clearly indicates otherwise.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method for wireless communication, comprising:
    receiving, by a terminal, a first message from a network device, wherein the first message comprises an indication of a preconfigured terminal-specific dedicated resource for a transmission from the terminal to the network device, the indication indicating a dedicated search space corresponding to the preconfigured terminal-specific dedicated resource, wherein the dedicated search space comprises a monitoring window duration, and wherein the dedicated search space is associated with a start monitoring time that is accurate to a subframe boundary;
    performing, by the terminal while being in an idle mode in which the terminal has no established Radio Resource Control (RRC) connection with the network device, the transmission to the network device using the preconfigured terminal-specific dedicated resources;
    monitoring, by the terminal, the dedicated search space in a Physical Downlink Control Channel (PDCCH) according to the indication; and
    receiving, by the terminal over the PDCCH, a second message from the network device comprising a Radio Network Temporary Identifier (RNTI).

2. The method of claim 1, wherein the preconfigured terminal-specific dedicated resource comprises a dedicated Physical Uplink Shared Channel (PUSCH) resource, and wherein the indication further comprises a start time of the dedicated PUSCH resource that is accurate to a subframe boundary.

3. The method of claim 1, comprising:
    entering the idle mode by the terminal upon receiving the first message from the network device.

4. The method of claim 1, wherein the first message comprises an RRC Connection Release message or an RRC Early Data Complete message.

5. A method for wireless communication, comprising:
    transmitting, by a network device to a terminal, a first message comprising an indication of a preconfigured terminal-specific dedicated resource for a transmission from the terminal to the network device, the indication indicating a dedicated search space corresponding to the preconfigured terminal-specific dedicated resource, wherein the dedicated search space comprises a monitoring window duration, and wherein the dedicated search space is associated with a start monitoring time that is accurate to a subframe boundary;
    receiving, by the network device, the transmission from the terminal while the terminal is in an idle mode in which the terminal has no established Radio Resource Control (RRC) connection with the network device; and
    transmitting, by the network device to the terminal, a second message over the dedicated search space in a Physical Downlink Control Channel (PDCCH) according to the indication, the second message comprising a Radio Network Temporary Identifier (RNTI).

6. The method of claim 5, wherein the preconfigured terminal-specific dedicated resource comprises a dedicated Physical Uplink Shared Channel (PUSCH) resource, and wherein the indication further comprises a start time of the dedicated PUSCH resource that is accurate to a subframe boundary.

7. The method of claim 5, wherein the first message triggers the terminal to enter the idle mode, the first message comprising an RRC Connection Release message or an RRC Early Data Complete message.

8. A wireless communication device, comprising a processor that is configured to:
    receive a first message from a network device, wherein the first message comprises an indication of a preconfigured terminal-specific dedicated resource for a transmission to the network device, the indication indicating a dedicated search space corresponding to the preconfigured terminal-specific dedicated resource, wherein the dedicated search space comprises a monitoring window duration, and wherein the dedicated search space is associated with a start monitoring time that is accurate to a subframe boundary;
    perform, while in an idle mode in which the wireless communication device has no established Radio Resource Control (RRC) connection with the network device, the transmission to the network device using the preconfigured terminal-specific dedicated resources;
    monitor the dedicated search space in a Physical Downlink Control Channel (PDCCH) according to the indication; and
    receive, over the PDCCH, a second message from the network device comprising a Radio Network Temporary Identifier (RNTI).

9. The device of claim 8, wherein the preconfigured terminal-specific dedicated resource comprises a dedicated Physical Uplink Shared Channel (PUSCH) resource, and wherein the indication further comprises a start time of the dedicated PUSCH resource that is accurate to a subframe boundary.

10. The device of claim 8, wherein the processor is configured to:
    enter the idle mode upon receiving the first message from the network device.

11. The device of claim 8, wherein the first message comprises an RRC Connection Release message or an RRC Early Data Complete message.

12. A wireless communication device, comprising a processor that is configured to:
    transmit, to a terminal, a first message comprising an indication of a preconfigured terminal-specific dedicated resource for a transmission from the terminal, the indication indicating a dedicated search space corresponding to the preconfigured terminal-specific dedicated resource, wherein the dedicated search space comprises a monitoring window duration, and wherein the dedicated search space is associated with a start monitoring time that is accurate to a subframe boundary; and receive the transmission from the terminal while the terminal is in an idle mode in which the terminal has no established Radio Resource Control (RRC) connection with the wireless communication device; and transmit, to the terminal, a second message over the dedicated search space in a Physical Downlink Control Channel (PDCCH) according to the indication, the second message comprising a Radio Network Temporary Identifier (RNTI).

13. The device of claim 12, wherein the preconfigured terminal-specific dedicated resource comprises a dedicated Physical Uplink Shared Channel (PUSCH) resource, and wherein the indication further comprises a start time of the dedicated PUSCH resource that is accurate to a subframe boundary.

14. The device of claim 12, wherein the first message triggers the terminal to enter the idle mode, the first message comprising an RRC Connection Release message or an RRC Early Data Complete message.

\* \* \* \* \*